US008312067B2

(12) United States Patent
Elias et al.

(10) Patent No.: US 8,312,067 B2
(45) Date of Patent: Nov. 13, 2012

(54) METHOD AND COMPUTER PROGRAM PRODUCT FOR ANALYZING DOCUMENTS (75) Inventors: Brian K. Elias, Springboro, OH (US); Matthew C. Morrise, Portland, OR (US)

(73) Assignee: LexisNexis Group, Miamisburg, OH (US)

( * ) Notice: Subject to any disclaimer, the term of this patent is extended or adjusted under 35 U.S.C. 154(b) by 443 days.

(21) Appl. No.: 12/314,592

(22) Filed: Dec. 12, 2008

(65) Prior Publication Data
US 2009/0157679 A1 Jun. 18, 2009

Related U.S. Application Data

(60) Provisional application No. 61/006,024, filed on Dec. 14, 2007.

(51) Int. Cl.
*G06F 17/30* (2006.01)
(52) U.S. Cl. ........................................................ 707/931
(58) Field of Classification Search .................. 715/255, 715/273; 707/937, 938, 741, 931, 934
See application file for complete search history.

(56) References Cited

U.S. PATENT DOCUMENTS

| 5,623,679 | A | * | 4/1997 | Rivette et al. | 715/255 |
| 5,623,681 | A | * | 4/1997 | Rivette et al. | 715/255 |
| 5,754,840 | A | * | 5/1998 | Rivette et al. | 1/1 |
| 5,774,833 | A | | 6/1998 | Newman | |
| 5,799,325 | A | * | 8/1998 | Rivette et al. | 715/209 |
| 5,806,079 | A | * | 9/1998 | Rivette et al. | 715/210 |
| 5,809,318 | A | * | 9/1998 | Rivette et al. | 715/202 |
| 5,845,301 | A | * | 12/1998 | Rivette et al. | 715/210 |
| 6,038,561 | A | * | 3/2000 | Snyder et al. | 1/1 |
| 7,412,441 | B2 | * | 8/2008 | Scott et al. | 1/1 |
| 7,516,492 | B1 | * | 4/2009 | Nisbet et al. | 726/27 |
| 7,533,096 | B2 | * | 5/2009 | Rice et al. | 1/1 |
| 8,037,075 | B2 | * | 10/2011 | Millett | 707/741 |

(Continued)

FOREIGN PATENT DOCUMENTS

JP 2003-308318 A 10/2003

(Continued)

OTHER PUBLICATIONS

Notification of Transmittal of the International Search Report and the Written Opinion of the International Searching Authority in International Application No. PCT/US 08/05859, mailed Oct. 23, 2008.

(Continued)

*Primary Examiner* — Jean M Corrielus
(74) *Attorney, Agent, or Firm* — Finnegan, Henderson, Farabow, Garrett & Dunner, LLP (57) ABSTRACT

Disclosed methods and computer program products provide tools for analyzing documents. For example, a computer program product that is stored on a computer-readable storage medium includes instructions that, when executed, cause a computer system to perform certain steps. The steps include, for example, receiving a selection of two or more documents for comparison, the documents including numbered sections, and automatically determining matching numbered sections between the two or more documents. In one embodiment, the steps further include, in response to the determining, displaying in a graphical user interface a representation of a first set of numbered sections from a first of the documents and a representation of a second set of numbered sections from a second of the documents, and indicating, in the graphical user interface, matching numbered sections between the first set of numbered sections and the second set of numbered sections.

18 Claims, 4 Drawing Sheets

U.S. PATENT DOCUMENTS

| | | |
|---|---|---|
| 2004/0083432 A1 | 4/2004 | Kawamura et al. |
| 2005/0010863 A1 | 1/2005 | Zernik |
| 2006/0190807 A1 | 8/2006 | Tran |
| 2006/0271522 A1* | 11/2006 | Scott et al. .................. 707/3 |
| 2008/0281860 A1 | 11/2008 | Elias et al. |
| 2009/0070301 A1 | 3/2009 | McLean et al. |
| 2009/0138466 A1 | 5/2009 | Henry et al. |
| 2009/0210828 A1 | 8/2009 | Kahn |
| 2009/0228777 A1 | 9/2009 | Henry et al. |
| 2009/0276694 A1 | 11/2009 | Henry et al. |
| 2010/0191748 A1* | 7/2010 | Martin et al. ............. 707/750 |

FOREIGN PATENT DOCUMENTS

| | | |
|---|---|---|
| JP | 2003-323322 A | 11/2003 |

OTHER PUBLICATIONS

Notification of Transmittal of the International Search Report and the Written Opinion of the International Searching Authority in International Application No. PCT/US2008/086540, mailed Mar. 9, 2009 (13 pages).

Brian K. Elias et al., U.S. Appl. No. 12/149,784, filed May 8, 2008, entitled Systems and Methods for Analyzing Documents.

Brian K. Elias et al., U.S. Appl. No. 12/813,976, filed Jun. 11, 2010, entitled "Systems and Methods for Analyzing Patent Related Documents."

* cited by examiner

METHOD AND COMPUTER PROGRAM PRODUCT FOR ANALYZING DOCUMENTS

RELATED APPLICATION

This application claims the benefit of priority from U.S. Provisional Application No. 61/006,024, entitled "Patent Claim Set Matching," filed Dec. 14, 2007, the disclosure of which is expressly incorporated herein by reference in its entirety.

BACKGROUND

1. Technical Field

The present disclosure generally relates to the field of computerized systems for analyzing documents. More particularly, the disclosure relates to methods and computer program products for analyzing patent-related documents.

2. Background Information

Analyzing patents can be a daunting task. As any patent practitioner would know, even the smallest alterations in the language used in the specification and the claims of a patent can cause major differences in claim construction during litigation and other proceedings. In some instances, applicants may file multiple patent applications with claims having slightly varying scope, in order to cover multiple claim construction scenarios. Analyzing the differences between these claims can be arduous and time consuming.

Typically, a person would manually perform such analysis by viewing multiple sets of claims as printouts or on a computer screen, and visually comparing each set of claims. One or more computer software tools, such as document comparison tools having redlining and other features, may be employed to aid in the analysis. However, this analysis method typically requires a person to manually review entire documents to determine the changes in the documents, and provides little or no visual guidance regarding similarities or differences between claims. As such, existing methods of analyzing patent-related documents are inefficient and may lead to inaccurate results due to human error.

The disclosed embodiments are directed toward an analysis tool which provides an improved method, system, and computer program product for analyzing patent-related documents or other documents.

SUMMARY

The embodiments disclosed herein include new and improved analysis tool features that enhance the efficiency and accuracy of comparing claims or other sections between two or more documents.

In one embodiment, a computer program product is disclosed. The computer program product is stored on a computer-readable storage medium, and includes instructions that, when executed, cause a computer system to perform certain steps. The steps include, for example, receiving a selection of two or more patent-related documents for comparison, and automatically determining matching claims between the two or more patent-related documents. The steps further include, for example, in response to the determining, displaying in a graphical user interface a representation of a first set of claims from a first of the patent related documents and a representation of a second set of claims from a second of the patent related documents, and indicating, in the graphical user interface, matching claims between the first set of claims and the second set of claims.

In another embodiment, a method of comparing claims between patent-related documents is disclosed. For example, the method includes receiving a selection of two or more patent-related documents for comparison, and automatically determining matching claims between the two or more patent-related documents. The method may further include, in response to the determining, providing for display in a graphical user interface a representation of a first set of claims from a first of the patent related documents and a representation of a second set of claims from a second of the patent related documents, and providing for display in the graphical user interface an indication of matching claims between the first set of claims and the second set of claims.

In a further embodiment, a computer program product is disclosed. The computer program product is stored on a computer-readable storage medium, and includes instructions that, when executed, cause a computer system to perform certain steps. The steps include, for example, receiving a selection of two or more documents for comparison, the documents including numbered sections, and automatically determining matching numbered sections between the two or more documents. In one embodiment, the steps further include, in response to the determining, displaying in a graphical user interface a representation of a first set of numbered sections from a first of the documents and a representation of a second set of numbered sections from a second of the documents, and indicating, in the graphical user interface, matching numbered sections between the first set of numbered sections and the second set of numbered sections.

It is to be understood that both the foregoing general description and the following detailed description are exemplary and explanatory only and are not restrictive of embodiments thereof, as claimed.

BRIEF DESCRIPTION OF THE DRAWINGS

The accompanying drawings illustrate various embodiments and aspects of the disclosure. In the drawings:

FIG. 2 illustrates an exemplary graphical user interface (GUI) for implementing an analysis tool, consistent with certain disclosed embodiments;

DETAILED DESCRIPTION

Reference will now be made in detail to the disclosed embodiments, examples of which are illustrated in the accompanying drawings. Wherever possible, the same reference numbers will be used throughout the drawings to refer to the same or like parts.

Figure 1:
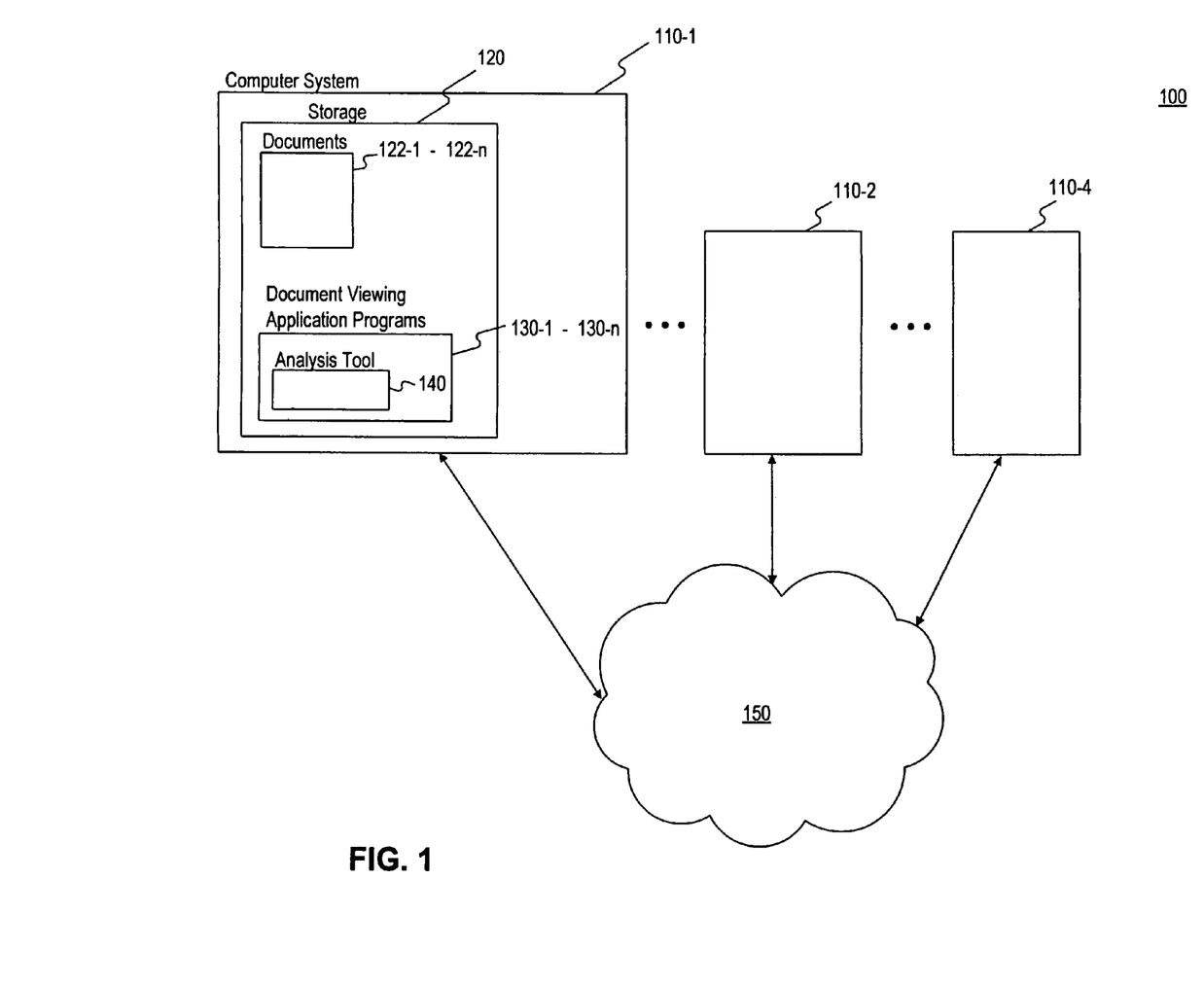
FIG. 1 illustrates an exemplary system for implementing an analysis tool, consistent with certain disclosed embodiments.

FIG. 1 depicts a system 100 in which the disclosed analysis tool may be implemented. System 100 may include, for example, computer systems 110-1 through 110-*n*; storage 120 storing, for example, documents 122-1 through 122-*n*, document viewing application programs 130-1 through 130-*n*, and analysis tool 140; and network 150.

In one embodiment, computer systems 110-1 through 110-*n* may include one or more desktop computers, laptop computers, personal digital assistants (PDAs), cellular phones, or other processing devices capable of carrying out the methods disclosed herein. For example, in one embodiment, computer system 110-1 is a computer including one or more processors, one or more memory storage devices for implementing storage 120, one or more input devices (e.g., keyboard, mouse, touch pad, etc.), a display screen, a network interface, computer program software for implementing document viewing application programs 130-1 through 130-*n* (e.g., a Web browser program and associated plug-ins, a word processing program such as Microsoft Word™, a document viewing program such as Adobe Acrobat™, etc.) and configured to allow a user to access and use the analysis tool 140 described herein, and other components.

Storage 120 may be implemented using any computer-readable storage medium capable of storing information. For example, storage 120 may include RAM, ROM, Flash Memory, or any other computer-readable memory medium. In one embodiment, storage 120 stores data such as electronic documents, computer program software, or other data. For example, storage 120 may store documents 122-1 through 122-*n*, may store document viewing application programs 130-1 through 130-*n*, may store analysis tool 140, and may store other documents, application programs, or computer-readable data. Storage 120 may include one or more storage memory devices, and may be distributed across one or more of computer systems 110-1 through 110-*n* such that certain documents, application programs, or other computer-readable data may be accessed and/or used across one or more computer systems in network 150.

Documents 122-1 through 122-*n* may include one or more text-based documents that may be retrieved and viewed by a user. For example, each document 122-1 through 122-*n* may be stored in storage 120 and may be accessible via any of computer systems 110-1 through 110-*n*. Documents 122-1 through 122-*n* may include different types of text-based documents, such as HTML documents accessible via a browser application program, word processing documents accessible via a word processing program, image-based documents that include text and may employ optical character recognition (e.g., PDF files viewable using the Adobe Acrobat™ application program), etc.

In one embodiment, documents 122-1 through 122-*n* are patent-related documents, including information such as a specification, drawings, claims, and/or other information associated with a patent or patent application. The term "patent-related documents" as used herein may refer to patent publications (e.g., issued patents, published patent applications), patent prosecution documents (e.g., amendments, unpublished specifications, claim charts, etc.), or other documents associated with one or more patents or patent applications and including one or more claims. Patent-related documents may include documents from any country or patent-issuing authority. Patent-related documents may be in any searchable text format, such as HTML format, pdf format, Microsoft Word™ format, etc., and may be retrieved from any source and stored in storage 120 in a single computer system, or across multiple computer systems over a network. Documents may be other types of documents as well, such as licenses, contracts, or other types of documents having numbered sections.

Document viewing application programs 130-1 through 130-*n* may include one or more Web browser programs, word processing programs, and/or image viewing programs capable of implementing analysis tool 140. In one embodiment, analysis tool 140 is configured to be used as an add-on to Microsoft Word™, Adobe Acrobat™, and/or one or more Internet browser application programs (e.g., Microsoft Internet Explorer™).

Analysis tool 140 may be a computer program product stored on a computer-readable storage medium, and may include computer-readable instructions that permit users to analyze patent-related documents using one or more of application programs 130-1 through 130-*n*. For example, in one embodiment, analysis tool 140 includes instructions for implementing a user interface, instructions for processing requests and commands received from a user via the user interface, and additional instructions for performing the analyses and methods described further below. The instructions may be carried out, in certain embodiments, using one or more software products and/or platforms (e.g., C++, Visual Basic™, etc.).

Network 150 may be any computer network capable of permitting computer systems 110-1 through 110-*n* to communicate with each other. For example, in one embodiment, network 150 is a computer network such as the Internet.

In one embodiment, analysis tool 140 permits a user to analyze and compare the claims in two or more patent-related documents. In an exemplary embodiment, analysis tool 140 may be used as an add-on to a word processing application program. For example, as depicted in FIG. 2, an application program graphical user interface (GUI) 200 may be displayed as a main application program portion or window 210 and supplemental portion or window 220. Main application program window 210 may include the typical GUI tools (e.g., toolbars, workspace, scroll bars, etc.) associated with a word processing application program (e.g., Microsoft Word™), and may additionally include an add-on toolbar 212 which is part of analysis tool 140 and which includes selectable objects (e.g., icons, buttons, etc.) that may be used to initiate analysis of patent-related documents. In one embodiment, add-on toolbar 212 includes a selectable object 212*a*, which may be selected to initiate, use of supplemental window 220.

In one embodiment, a user may select a "compare claims" object 212*a* for a plurality of selected documents, and for each document in which the object 212*a* is selected, that document is added to a list of documents. Then, two or more of the documents in the list may be compared to each other. In one embodiment, anywhere between two and six documents can be compared using analysis tool 140. However, a larger number of documents may be compared as well. Upon selection of the documents for comparison, a window such as supplemental window 220 may be displayed. Supplemental window 220, also referred to herein as "compare claims window" 220, includes a number of features which may be utilized by a user in order to analyze the claims and other portions of patent-related documents.

In the examples below, the description of the features associated with supplemental window 220 assumes a user has selected two documents for comparison. However, certain of the features described herein may also be used in situations where three or more documents have been selected for comparison.

Figure 3:
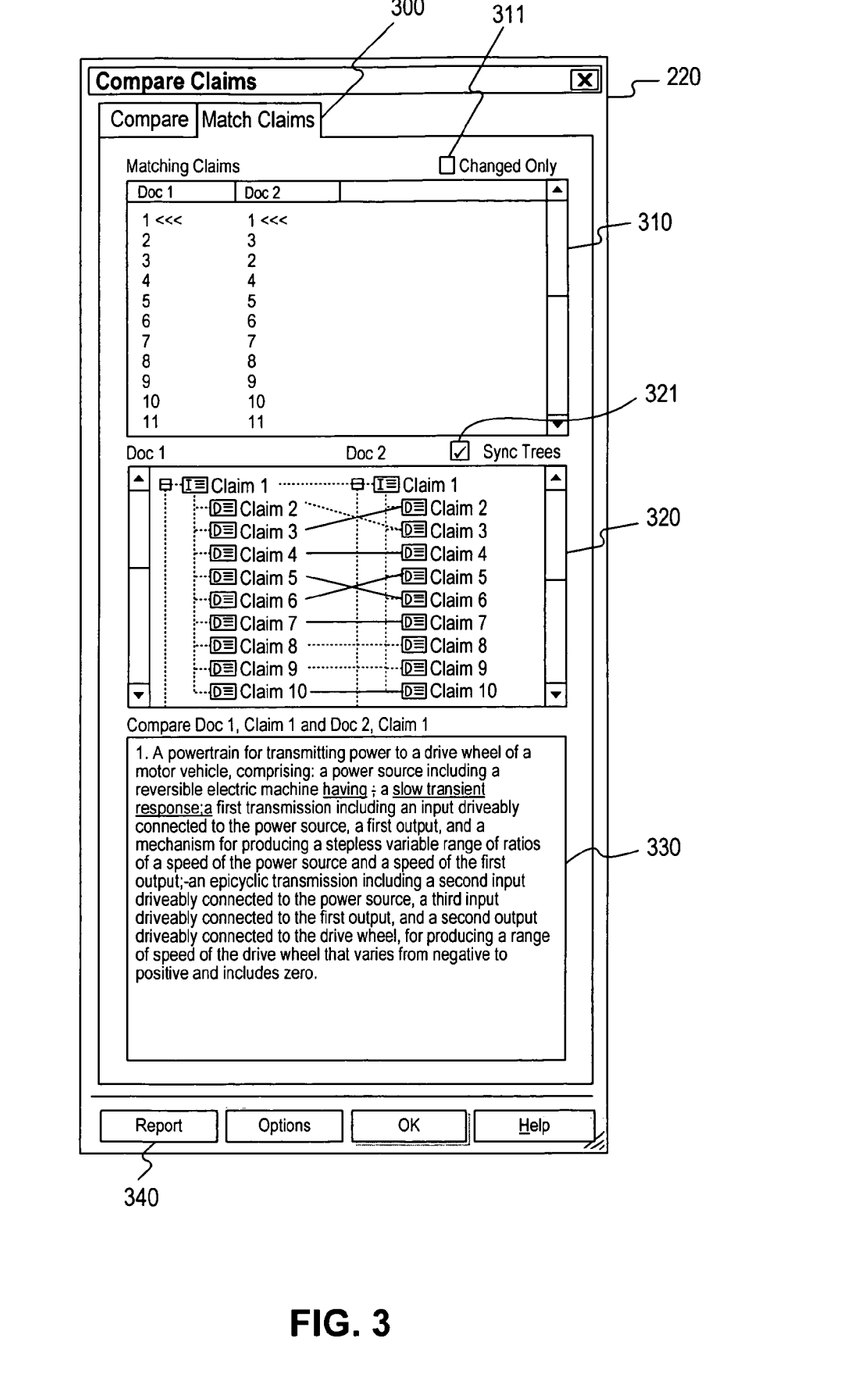
FIG. 3 further illustrates an exemplary graphical user interface (GUI) for implementing an analysis tool, consistent with certain disclosed embodiments.

FIG. 3 depicts one embodiment of compare claims window 220 (shown as "match" tab 300) which provides different ways in which to view and analyze similarities and differences between claims of two or more documents. The information included and displayed in match tab 300 (also referred to as "display" 300) is derived from the documents selected for comparison, and is further derived based on one or more algorithms, hereinafter referred to as "claim matching algorithms," and described further below. In one embodiment, as a result of the claim matching algorithms, claim information may be displayed in one or more window portions 310, 320, and 330.

For example, window portion 310 (also referred to as "pane" or "display portion" 310) may include two or more adjacent columns including a column for each selected document, and in each column, a list of the claims in the document. In one embodiment, where claims across different documents are determined by the analysis tool 140 to be "matching" based on one of more claim matching algorithms, the claim numbers for those claims appear in pane 310 in the same row. Claim numbers for claims in any of the selected documents which do not have a match in any other document will be displayed in a row by themselves. Accordingly, display portion 310 visually, and automatically indicates to a user which claims between two or more documents are matching.

Claims may be determined to be "matching" based on different criteria. For example, in one embodiment, claims are determined to be "matching" if they are an exact match. In an exact match, all of the claim language for the two compared claims is the same, though the claim numbers for the compared claims may be different. In an additional, or alternative, embodiment, claims are determined to be "matching" if they are a close match. In a close match, some of the claim language is the same, but some of the language is different. Claims in one document may also be determined to have no matching claims in a second document. Different algorithms for determining an exact match, close match, or no match are described further below.

Window portion 320 (also referred to as "pane" or "display portion" 320) may include a display of a claim hierarchy for the claims of each of the two selected documents, and may indicate the relationship between claims between the two documents. The claim hierarchies may be determined, for example, by a routine that analyzes claim references among claims within a document. For example, if a claim refers to a previous claim, the claim number of the referencing claim is subordinate or dependent on the claim number of the referenced claim in the hierarchy. Once the claim hierarchies are determined, the claim hierarchies may be displayed. In one embodiment, the claim hierarchies are displayed adjacent to each other. Based on which claims are determined to be matching (e.g., an exact match or close match, based on one or more claim matching algorithms), an appropriate indicator may be displayed between matching claims across the two hierarchies. For example, in one embodiment, a first indicator (e.g., a solid line) is used to indicate claims identified as an exact match and a second indicator (e.g., a dotted line) is used to indicate claims identified as a close match. Although a solid line and dotted line are described above, any desired indicator can be used (e.g., different line styles, colors, etc.).

In one embodiment, each claim in the first document will either have no matching claims in the second document, or will have one matching claim from the second document. In another embodiment, a claim matching algorithm can determine that two or more claims from one document, when combined, match one claim from a second document. In such a case, the two claims from the first document may both be indicated as matching the claim from the second document, and the indicator may be a different type of indicator (e.g., a different color line, dashed line, etc.) to show that the two claims are combined match the claim from the second document.

In one embodiment, display portion 320 may include additional information indicating the status of the claims in each selected document. For example, icons can be used for each claim that indicate whether the claim is an independent claim (e.g., an icon with the letter "I"), a dependent claim (e.g., an icon with the letter "D"), or a multiple dependent claim (e.g., with an icon with the letter "M"). Additional icons may also be used to indicate the status of the claims (e.g., an "A" icon indicating that one or more terms in a claim include a claim element as an antecedent, an "R" icon indicating that one or more terms in a claim references a previously described element, an "LA" icon indicating that one or more of the terms in a claim lack antecedent basis, an "AA" indicating that one or more terms in a claim include an ambiguous reference to a previously described element, etc.).

Therefore, as with pane 310, pane 320 visually, and automatically indicates to a user which claims between two or more documents are matching. Pane 320 also indicates additional details, such as where in the claim hierarchy certain matching claims reside, a level of similarity between matching claims in two documents (e.g., exact matches or close matches), and information about claim dependencies and claim terms.

Analysis tool 140 may include an additional feature in connection with panes 310 and 320 that permits a user to select any claim listed in either of panes 310 or 320, and in response causes that claim to be displayed in the context of the actual document in which it appears. For example, selection of a claim from a column in pane 310 or 320 corresponding to a first document would cause that document to come to the foreground in main application program window 210, and would navigate within the document to cause the portion of the document having the selected claim to be displayed.

In one embodiment, an additional display portion 330 may be used to view the differences in claim language between claims selected in either of display portions 310 or 320. For example, a user may recognize that two claims are a close match, and may desire to view the differences between the claim language for those claims. Analysis tool 140 permits a user to view such differences by selecting two claims to compare in either display portion 310 or display portion 320.

For example, a user may select a claim corresponding to a first document from a first column in display portion 310, and a claim corresponding to a second document from a second column in display portion 310. The user may select claims (e.g., claims that appear to be matching), in order to view the similarities and differences between the claim language for those claims. As shown in FIG. 3, an indicator (e.g., chevron or other visual indicator) may be displayed in display portion 310 for the claims selected. In one embodiment, in response to selection of the claims, text illustrating the claim language for the two claims appears in display portion 330. For example, the text may appear as redline or similar text which indicates which claim terms are the same between the two claims (e.g., no marking), which claim terms are only in a first of the claims (e.g., terms marked with underline), and which claim terms are only in the other claim (e.g., terms marked with strikethrough).

For example, in one embodiment, a user first selects a claim from a first document, and then selects a claim from a second document. The claim for the first document may be represented (e.g., as a claim number or other identifier), for example, in a first column in display portion 310 or 320 and the claim for the second document may be represented (e.g., as a claim number or other identifier), for example, in a second column in display portion 310 or 320. Display portion 330 then reflects the similarities and differences between the two selected claims. For example, same terms from both claims may appear without any markup, terms that are in the first claim but not the second claim may appear with a first designation (e.g., strikethrough), and terms that are in the second claim but not the first claim may appear with a second designation (e.g., underline). Although a "redline" type indication scheme is described, other indication schemes which indicate changes in claim language may be used as well.

In one embodiment, a user may select claims to compare from the claims represented in display portion 320 instead of selecting from display portion 310. Alternatively, a user may select a claim from one document in display portion 310 and a claim from another document in display portion 320. The selected claims may be indicated concurrently in both display portions 320 and 310 with an indicator (e.g., chevron, highlighting, etc.) indicating that the claims have been selected for comparison.

In an embodiment where multiple claims from one document are combined to match a single claim from a second document, additional features may be included in display portions 310, 320, and 330. For example, if the user selects a column in display portion 310 corresponding to a first patent-related document, and two claims of that document, when combined, match a single claim in a second patent-related document, then those two claims may be listed in separate rows, and the single matching claim is listed twice—once in each of the separate rows—in the column for the second document. Along those same lines, if one claim in the selected first document is a match of two combined claims in the second document, then the one claim will appear in one row for the first document, and both of the two combined claims will be appear in the same row in the column for the second document. The following table demonstrates this feature, where the column for document 2 has been selected, claims 1 and 2 from document 2 combine to match claim 1 of document 1, and claim 3 of document 2 is a match for combined claims 2 and 3 of document 1.

| Doc 1 | Doc 2<<< |
|-------|----------|
| 1     | 1        |
| 1     | 2        |
| 2, 3  | 3        |

A further feature of combined claim matching may be accessed via window portion 320. Because combined claim matches are different from individual matches, they may be designated using different indicators (e.g., different colored lines, line styles, etc.). In one embodiment, for example, in window portion 320 for matches between an individual claim in one document and a plurality of combined claims in a second document, multiple lines may connect the individual claim to the plurality of combined claims (e.g., one line extending from the individual claim to each of the plurality of combined claims). These lines may indicate they are part of a combined claim match, for example, by appearing in a particular color or line style.

Analysis tool 140 may include additional features which aid in analyzing patent-related documents. For example, display 300 may include a selectable object 311 (referred to as a "changed only" box) which, when selected causes only close matching and non-matching claims to be represented in window portion 310. As such, when changed only box 311 is selected, none of claim numbers for exact match claims will appear in the columns in window portion 310.

A further feature that may be included in analysis tool 140 is a selectable object 321 (referred to as a "sync trees" box) which, when selected causes analysis tool 140 to synchronize scrolling for the two sets of claims in pane 320, such that the two sets of claims scroll simultaneously when a user selects either of the scroll bars in pane 320.

As described above, one or more claim matching algorithms may be used to determine matching claims between patent-related documents. For example, where two patent-related documents that include claims are being compared, an exemplary algorithm may perform certain steps to determine which claims in the first document match claims in the second document.

An exemplary algorithm may include, for example, a first step in which the size of each of the claims (e.g., number of words and/or characters) in each of the first and second document are determined. Different claims may be recognized by searching each document for numbered sections, such as portions of the document including claim numbers. For each traversed claim in the first document, and starting with claims closest in size to that claim and continuing downward in size similarity until the size difference between that claim and the claims in the second document reaches a particular threshold (e.g., difference in size is greater than 100 characters), the algorithm compares the text of the traversed claim with the text of each claim in the second document. In one embodiment, the text may be compared by comparing the number of similar terms (e.g., words and/or phrases) between the two claims.

Claims are determined to be exact matches if all of the words in the traversed claim (excluding the claim number) are the same as all of the words in the claim from the second document, and vice versa. Claims are determined to be close matches if more than a predetermined threshold percentage of the terms between the two claims are identical (e.g., 50%, 70%, 80%, etc.). The predetermined percentage may be determined, for example, based on experimental analysis to determine a percentage that results in the most optimal results and/or based on a user's selection of a desired optimal level of inclusion. In an alternative embodiment, claims may be determined as close matches based on a threshold number of identical terms, or based on an algorithm that depends on an amount (e.g., number, percentage) of identical terms between the two claims. After comparing the traversed claim to each of the claims in the second document, the claim with the greatest similarity (e.g., greatest percentage of identical terms) to the traversed claim is designated as a match.

A further element to the algorithm checks whether the claim from the second document that matches the traversed, first claim from the first document has already been designated as a matching claim for a different (i.e., second) claim in the first document. If so, the algorithm selects from among the two claims in the first document the claim having the greatest similarity (e.g., greatest percentage of identical terms) to the matched claim in the second document. If the algorithm determines that the first claim from the first document is more similar to the matching claim than the second claim from the first document, the second claim is removed as a match from the matching claim, and may be re-traversed to determine whether it matches another claim in the second document.

The result of this algorithm is that each claim in the first document will be traversed and matched with a most similar matching claim in the second document, if such a claim exists within the matching threshold (e.g., 50%, 70%, 80%, etc. of words in claim being identical), and claims with no matches will not be matched with other claims.

One or more additional elements may be included in the claim matching algorithm described above. For example, in one embodiment, terms between two claims are considered "identical," for comparison purposes, based on the terms being the same or being equivalents. For example, to determine equivalent terms, the claim matching algorithm may identify claim terms (e.g., individual words or phrases) that appear with numerical labels in the specification, and may then determine other terms in the specification which use the same numerical label. Those other terms which use the same numerical label may be considered equivalent terms. If the different, but equivalent terms appear across two claims being compared, they may be considered "identical" words for the purpose of determining the similarity (e.g., percentage of identical terms) between the two claims. Alternatively, or additionally, the algorithm may look up claim terms to determine semantic equivalents, and may consider those semantic equivalents as "identical" terms in determining the similarity between two claims.

Thus, for example, if a first claim includes the term "window," and the term "window" is labeled as 500 in a patent specification, the algorithm will search the specification to determine if any other terms are associated with the label 500 in the specification. The algorithm may additionally look up a semantic equivalent index to determine if other terms are semantic equivalents to the term "window." The algorithm may, for example, determine that the terms "display" and "pane" are both associated with the label 500 in the specification, and that additional terms "screen," "graphical user interface," and "GUI" are semantic equivalents to "window." As a result, any of the terms "display," "pane," "screen," "graphical user interface," and "GUI" in a first claim would be considered "identical" to the word "window" in a second claim being compared to the first claim for the purpose of determining close matches (but not for determining exact matches).

The claim matching algorithm may include an additional element in the situation where claims are determined to be non-matching. In certain situations, a claim in one document may be, for the most part, a combination of two claims in a second document. For these types of claims, the algorithm may determine that the one claim in the first document is a match for the combination of the two claims in the second document. To determine this, after matched claims are determined between two claim sets, the algorithm combines each unmatched claim in a document with up to two other unmatched claims in that document, eliminates overlapping language from the combined claims and optionally eliminates other terms (e.g., terms which may be stored on a list of removable terms), and then treats that combined claim as a single claim and compares the combined claim using the methods described above to unmatched claims (or combined claims) in the other document. If a combined claim matches another combined claim or an individual claim, it is considered a close match, and may be designated as a combined match.

In one embodiment, analysis tool 140 may include a reporting feature which automatically creates a report comparing claim sets between two documents, and then presents the report to a user (e.g., by displaying on a screen, printing, etc.). Such a report may be referred to as a matching claims report. For example, a report can be created after two documents have been selected for comparison and a user selects a selectable object, such as "report" button 340 depicted in FIG. 3. A matching claims report may include one or more sections summarizing the comparison of claim sets between two selected documents.

One exemplary report section includes a table showing matching claims between two or more documents, similar to the information that can be displayed in display portion 310 of FIG. 3. For example, a report may include a matching claims table in the following format:

| Doc 1 | Doc 2 |
|-------|-------|
| 1     | 1     |
| 2     |       |
| 3     | 2     |
| 4     | 4     |
| 5     | 5     |
| 6     | 6     |
| 7     | 7     |
| 8     | 8     |
| 9     | 9     |
| 10    | 10    |
| 11    | 11    |
|       | 3     |

The above table indicates that claim 1 of document 1 matches claim 1 of document 2, claim 2 of document 1 has no matches in document 2, claim 3 of document 1 matches claim 2 of document 2, etc.

Another exemplary portion of the matching claims report may include one or more tables separately listing, for two compared documents, redline text for exact claim matches, close claim matches, and unmatched claims. For example, a report may include a first compare claims table that lists, in each row of the table, the redline comparison of the text between two matching claims having exact matches, with appropriate redline markups for any matching claims having different claim numbers. The report may include a second claims table that lists, in each row of the table, the redline comparison of the text between two matching claims having close matches, with appropriate redline markups. Additionally, the report may include a third table that lists in each row the text for each claim in the first document that does not have any matching claims in the second document, and an optional fourth table that lists in each row the text for each claim in the second document that does not have any matching claims in the first document.

In one embodiment, a report further includes a section that displays the claim hierarchy for each of the selected documents. For example, the hierarchy for each document can appear similar to the hierarchy depicted in window portion 320 depicted in FIG. 3. By automatically creating a detailed claim set matching report in the manner described above, a user can easily and quickly view a summary analysis of all of the claims in two or more patent-related documents. Reports may be created in any desirable format and using any desired application program (e.g., Microsoft Word™ format, HTML format, etc.).

Figure 4:
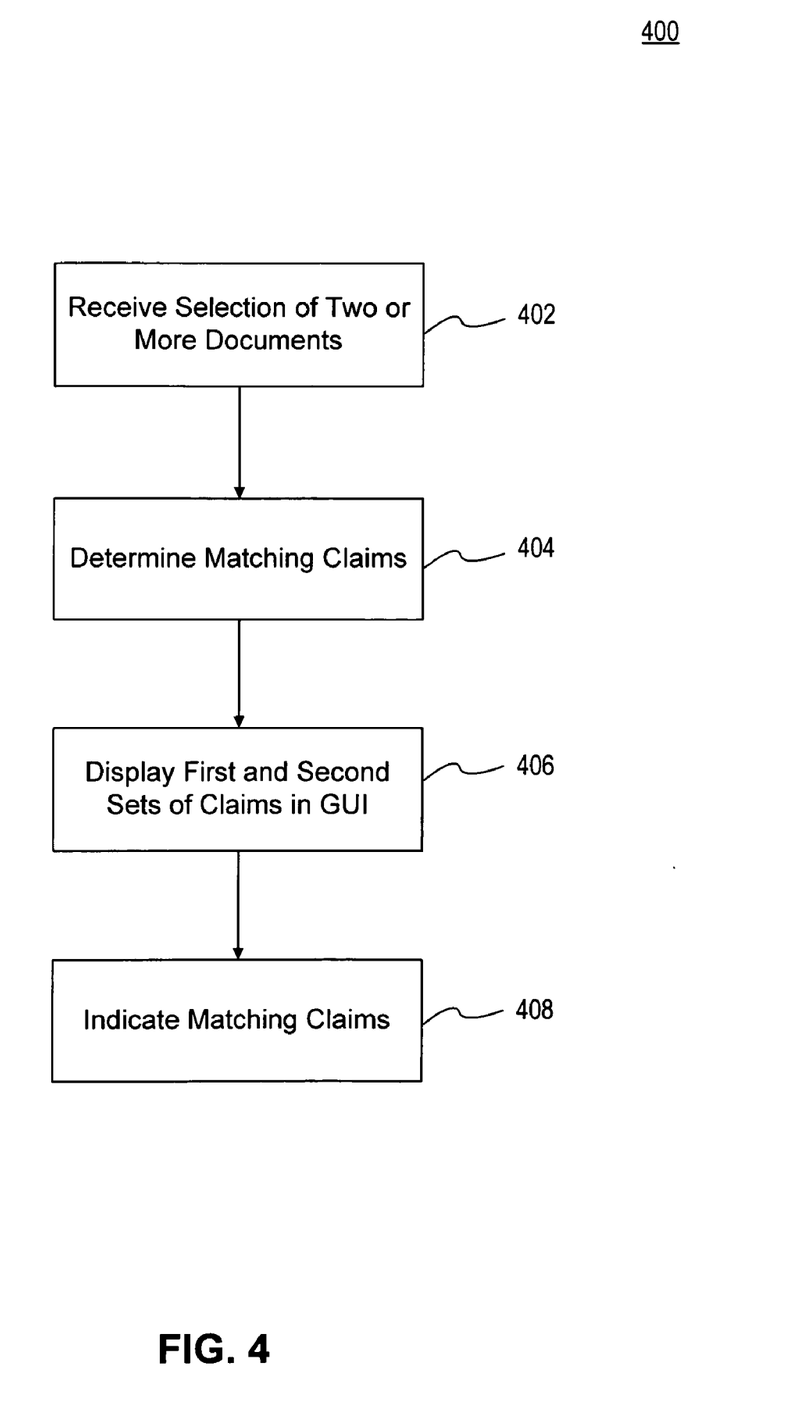
FIG. 4 is an exemplary flow diagram of a method for comparing claims between patent-related documents, consistent with certain disclosed embodiments.

An exemplary flow diagram of a method 400 of comparing claims between patent-related documents is depicted in FIG. 4. In step 402, a selection of two or more documents is received. For example, as described above, a user may select two or more patent-related documents from which to compare claims. The selection may be made, for example, using a tool such as analysis tool 140, which permits a user to select a compare claims object 212*a* to select a plurality of documents from which to compare claims.

In step 404, the analysis tool 140 automatically determines matching claims among the selected documents. The matching claims may be determined, for example, using a claim searching algorithm that includes one or more of the elements described above.

In step 406, a representation of a first set of claims from a first of the patent-related documents, and a representation of a second set of claims from a second of the patent-related documents are displayed in a graphical user interface. The sets of claims may be displayed by analysis tool 140, for example, in a display portion such as depicted in window 220 of FIG. 2. For example, a first set of claims may be displayed as a list adjacent to a list of a second set of claims, as depicted in display portion 310 of FIG. 3. Alternatively, or additionally, a first and second set of claims may be displayed as a two adjacent claim hierarchies, as depicted in display portion 320 of FIG. 3.

In step 408, matching claims between the first set of claims and second set of claims are indicated. For example, as depicted in display portion 310 of FIG. 3, analysis stool 140 may indicate claims as matching if they appear in the same row in a table or other data structure. Alternatively, or additionally, claims may be indicated as matching by using indicators (e.g., lines) between matching claims, such as depicted in display portion 320 of FIG. 3.

Although the steps disclosed in FIG. 4 are shown as separate steps in a particular order, they need not be performed separately or in the order given. For example, steps 406 and 408 may be performed simultaneously, such that the displaying of the sets of claims occurs at the same time as the indication of matching claims (i.e., two claim lists are displayed with matching claims in the same rows, thus simultaneously being displayed and indicating which claims are matching).

Although the above embodiments describe analysis tool 140 in the context of patent-related documents and claim matching, the principles and methods described above may be applied to other documents, such as licenses, contracts, or other similarly structured documents having numbered sections similar to those in patent-related documents.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments may be implemented as a combination of hardware and software or in hardware alone. Additionally, although certain storage and memory devices are described above, one skilled in the art will appreciate that these devices may include other types of computer readable media, such as, for example, hard disks, floppy disks, or CD ROM, external hard drives, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of Java, C++, HTML, XML, HTML with included Java applets, etc. One or more of such software sections or modules can be integrated into a computer system or existing application program software.

Moreover, while illustrative embodiments have been described herein, the scope includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A computer program product stored on a computer-readable storage medium, the computer program product including instructions that, when executed, cause a computer system to perform the steps of:

receiving a selection of two or more patent-related documents for comparison;

identifying, for each of the two or more patent-related documents, at least one group of terms associated with a numerical label in the specification;

associating terms of the at least one group of terms as equivalents based at least on the identified association with the numerical label in the specification;

determining matching claims between the two or more patent related documents based at least on the association;

in response to the determining, displaying in a graphical user interface a representation of a first set of claims from a first of the patent-related documents and a representation of a second set of claims from a second of the patent-related documents; and indicating, in the graphical user interface, matching claims between the first set of claims and the second set of claims.

2. The computer program product of claim 1, wherein:

the two or more patent-related documents include three or more patent-related documents, and the steps further include:

displaying in a display portion of the graphical user interface a representation of a third set of claims from a third of the patent-related documents, and indicating matching claims between each of the first set of claims, the second set of claims, and the third set of claims.

3. The computer program product of claim 1, wherein indicating the matching claims further includes:

displaying, in a display portion of the graphical user interface, the first set of claims as a claim hierarchy;

displaying, in the display portion of the graphical user interface, the second set of claims as a claim hierarchy; and for each of the claims determined to be matching, displaying an indicator between the matching claim in the first claim hierarchy and the matching claim in the second claim hierarchy.

4. The computer program product of claim 3, wherein:

for claims that are exact matches, the indicator indicates an exact match; and for claims that are close matches, the indicator indicates a close match.

5. The computer program product of claim 1, wherein the steps further include:

receiving a selection of a first claim from the first set of claims;

receiving a selection of a second claim from the second set of claims; and displaying, in a display portion of the graphical user interface, a description of the similarities and differences between the first claim and the second claim.

6. The computer program product of claim 5, wherein displaying the description of the similarities and differences includes displaying redline text indicating which terms are included in both claims, which terms are in the first claim only, and which terms are in the second claim only.

7. The computer program product of claim 1, wherein the matching claims include two claims from the first set of claims, which, when combined, match one claim from the second set of claims.

8. The computer program product of claim 1, wherein the steps further include:
   receiving a selection from a user to create a report for matching claims;
   in response to the selection, automatically generating a matching claims report, the matching claims report including one or more of:
   a table listing matching claim numbers between the two or more patent-related documents, and
   one or more tables displaying, for each of the matching claims between the first patent-related document and the second patent-related document, the similarities and differences between the matching claim from the first patent-related document and the matching claim from the second patent-related document; and
   presenting the report to a user.

9. The computer program product of claim 1, wherein automatically determining matching claims between the two or more patent-related documents further includes:
   comparing each claim from the first patent-related document to each claim in the second patent-related document;
   for each comparison, determining the number of identical terms between the two claims being compared; and
   determining a claim from the first patent-related document and a claim from the second patent-related document to be matching if the two claims have more than a predetermined threshold amount of identical terms and if the two claims have a greater percentage of identical terms in common than all other claim comparisons between the claim from the first patent-related document and a claim from the second patent-related document.

10. The computer program product of claim 9, wherein the predetermined threshold is a percentage greater than 70%.

11. The computer program product of claim 10, wherein terms are determined to be identical if the terms include the same words or if the terms are equivalent.

12. The computer program product of claim 11, wherein terms are determined to be equivalent based on one or more of:
   whether the terms are described in connection with a same numerical label in the specification of either the first patent-related document or the second patent-related document; or
   whether the terms are semantic equivalents.

13. A method of comparing claims between patent-related documents, comprising:
   receiving a selection of two or more patent-related documents for comparison;
   identifying, for each of the two or more patent-related documents, at least one group of terms associated with a numerical label in the specification;
   associating terms of the at least one group of terms as equivalents based at least on the identified association with the numerical label in the specification;
   determining matching claims between the two or more patent-related documents based at least on the association;
   in response to the determining, providing for display in a graphical user interface a representation of a first set of claims from a first of the patent-related documents and a representation of a second set of claims from a second of the patent-related documents; and
   providing for display in the graphical user interface an indication of matching claims between the first set of claims and the second set of claims.

14. The method of claim 13, further comprising:
   providing the indication of matching claims by one or more of:
   displaying the first set of claims as a list in a first column and displaying the second set of claims as a list in a second column adjacent to the first column, and
   displaying the first set of claims as a claim hierarchy and displaying the second set of claims adjacent to the first set of claims as a claim hierarchy;
   receiving a selection of a first claim from the first set of claims;
   receiving a selection of a second claim from the second set of claims; and
   providing for display in the graphical user interface a description of the similarities and differences between the first claim and the second claim.

15. The method of claim 14, further comprising:
   comparing each claim from the first patent-related document to each claim in the second patent-related document;
   for each comparison, determining the number of identical terms between the two claims being compared; and
   determining a claim from the first patent-related document and a claim from the second patent-related document to be matching if the two claims have more than a predetermined threshold amount of identical terms and if the two claims have a greater percentage of identical terms in common than all other claim comparisons between the claim from the first patent-related document and a claim from the second patent-related document.

16. The method of claim 15, wherein the predetermined threshold is a percentage greater than 70%.

17. The method of claim 15, wherein terms are determined to be identical if the terms include the same words or if the terms are equivalent.

18. The method of claim 17, wherein terms are determined to be equivalent based on one or more of:
   whether the terms are described in connection with a same numerical label in the specification of either the first patent-related document or the second patent-related document; or
   whether the terms are semantic equivalents.

* * * * *